(12) United States Patent
Dupré

(10) Patent No.: US 9,300,474 B2
(45) Date of Patent: Mar. 29, 2016

(54) ENHANCED AUTHENTICATION AND/OR ENHANCED IDENTIFICATION OF A SECURE ELEMENT OF A COMMUNICATION DEVICE

(71) Applicant: Deutsche Telekom AG, Bonn (DE)

(72) Inventor: Michael Dupré, St. Augustin (DE)

(73) Assignee: DEUTSCHE TELEKOM AG, Bonn (DE)

( * ) Notice: Subject to any disclaimer, the term of this patent is extended or adjusted under 35 U.S.C. 154(b) by 24 days.

(21) Appl. No.: 14/492,127

(22) Filed: Sep. 22, 2014

(65) Prior Publication Data

US 2015/0089214 A1   Mar. 26, 2015

(30) Foreign Application Priority Data

Sep. 23, 2013   (EP) .................................. 13185556

(51) Int. Cl.
| | |
|---|---|
| *G06F 21/32* | (2013.01) |
| *H04L 9/32* | (2006.01) |
| *H04L 29/06* | (2006.01) |
| *H04W 12/06* | (2009.01) |

(52) U.S. Cl.
CPC .............. *H04L 9/3247* (2013.01); *H04L 9/321* (2013.01); *H04L 9/3263* (2013.01); *H04L 63/0853* (2013.01); *H04W 12/06* (2013.01)

(58) Field of Classification Search
CPC ... H04L 9/3247; H04L 63/0853; H04L 9/321; H04L 9/3263; H04W 12/06
USPC .................................................. 713/151–157
See application file for complete search history.

(56) References Cited

U.S. PATENT DOCUMENTS

| | | | | |
|---|---|---|---|---|
| 9,094,429 B2* | 7/2015 | Brown | ................... | H04L 12/583 |
| 2005/0009502 A1* | 1/2005 | Little | ................... | G06Q 10/107 |
| | | | | 455/411 |
| 2007/0245144 A1* | 10/2007 | Wilson | ................ | G06F 21/6254 |
| | | | | 713/170 |
| 2008/0109891 A1* | 5/2008 | Greenwald | ............. | H04L 47/12 |
| | | | | 726/13 |
| 2009/0019284 A1* | 1/2009 | Cho | ....................... | H04W 12/06 |
| | | | | 713/170 |
| 2009/0210703 A1* | 8/2009 | Epstein | ................... | H04L 9/006 |
| | | | | 713/157 |
| 2012/0131329 A1* | 5/2012 | Liang | .................. | H04L 12/4625 |
| | | | | 713/151 |
| 2013/0007868 A1* | 1/2013 | Hoggan | ................. | H04L 9/3263 |
| | | | | 726/8 |
| 2013/0252585 A1* | 9/2013 | Moshir | ................... | G06F 21/35 |
| | | | | 455/411 |
| 2013/0326214 A1* | 12/2013 | McCanna | ............. | H04L 9/3268 |
| | | | | 713/156 |

(Continued)

FOREIGN PATENT DOCUMENTS

| | | | |
|---|---|---|---|
| WO | WO 2004032554 A1 | 4/2004 | |
| WO | WO 2004097590 A2 | 11/2004 | |

*Primary Examiner* — Haresh N Patel
(74) *Attorney, Agent, or Firm* — Leydig, Volt & Mayer, Ltd.

(57) ABSTRACT

A method for enhanced authentication and/or enhanced identification of a secure element of a user equipment includes: transmitting a first message to a secure element; receiving a second message, from the secure element at a first server entity, the second message including at least the signed public key and a signature information, wherein the signing message content includes at least one information element that is omitted in the second message; transmitting a third message, to the second server entity, the third message including at least the signed public key and the signature information, wherein the signing message content is accessible to or derivable by the second server entity in view of a verification of the signature information contained in the second message for authentication and/or identification purposes.

11 Claims, 1 Drawing Sheet

(56) References Cited

U.S. PATENT DOCUMENTS

| | | | | |
|---|---|---|---|---|
| 2014/0115676 A1* | 4/2014 | Coghlan | ............... | H04W 12/06 726/6 |
| 2014/0259132 A1* | 9/2014 | Gough | ................ | H04L 63/0823 726/6 |
| 2015/0180978 A1* | 6/2015 | Canpolat | ............... | H04L 5/0092 370/329 |

* cited by examiner

ENHANCED AUTHENTICATION AND/OR ENHANCED IDENTIFICATION OF A SECURE ELEMENT OF A COMMUNICATION DEVICE

CROSS-REFERENCE TO RELATED APPLICATIONS

Priority is claimed to European Patent Application No. EP 13185556.1, filed on Sep. 23, 2013, the entire disclosure of which is hereby incorporated by reference herein.

FIELD

The present invention relates to a method for an enhanced authentication and/or an enhanced identification of a secure element located in a communication device, especially associated to a subscriber of a mobile communication network and especially being a user equipment.

The present invention further relates to a secure element, especially a SIM (Subscriber Identity Module) element, for an enhanced authentication and/or an enhanced identification of the secure element, the secure element being located in a communication device, especially associated to a subscriber of a mobile communication network and especially being a user equipment.

The present invention additionally further relates to a system for an enhanced authentication and/or an enhanced identification of a secure element, especially a SIM element, located in a communication device, especially associated to a subscriber of a mobile communication network and especially being a user equipment.

BACKGROUND

In case that a smart phone application, in the following called "application", connects to a portal/server entity of a network operator or service provider via a mobile communication network, the mobile communication network knows the IP address and thus is able to identify the subscriber (that could, of course, also be a M2M device (Machine to Machine communication device) or a MTC (Machine Type Communication) device) by mapping the current IP address to the MSISDN (Mobile Subscriber ISDN (Integrated Services Digital Network) Number).

However if the connection to a server entity/portal is done while the communication device (or the user equipment or the M2M/MTC device) is connected, e.g., via a WLAN, the network operator or service provider (i.e. the server entity or the portal) does not know (at least not for sure) the identity of the subscriber/device, especially not the MSISDN number.

For operator based billing services or M2M services, the MSISDN of a customer is often used as identification attribute. Therefore it is important that the correct MSISDN of a subscriber is known to the service provider and used for billing or for reaching the M2M device.

There are several conventional methods available to authenticate and/or identify the user, e.g. by using OTP (one time PIN, which is sent e.g. via SMS to the mobile with the MSISDN provided by the customer) or via prior registration and log in with username and password. However, these conventional authentication mechanisms are cumbersome for the user.

SUMMARY

In an embodiment, the present invention provides a method for enhanced authentication and/or enhanced identification of a secure element of a user equipment, the secure element being associated with a subscriber of a mobile communication network. A communication link is established between the user equipment and a first server entity, wherein the secure element includes a signed public key and a private key. The secure element and/or the user equipment is authenticated and/or identified by a second server entity. The method includes: transmitting a first message to the secure element; receiving a second message, subsequent to the transmission of the first message, from the secure element at the first server entity, the second message including at least the signed public key and a signature information, the signature information being generated from a signing message content using the private key, wherein the signing message content includes at least one information element that is omitted in the second message; and transmitting a third message, subsequent to the transmission of the second message, to the second server entity, the third message including at least the signed public key and the signature information, wherein the signing message content is accessible to or derivable by the second server entity in view of a verification of the signature information contained in the second message for authentication and/or identification purposes. A certificate is used as the signed public key, including a public key together with a subject and a signature. The second server entity retrieves the at least one information element from the subject of the certificate. The subject is an identification information of the secure element.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
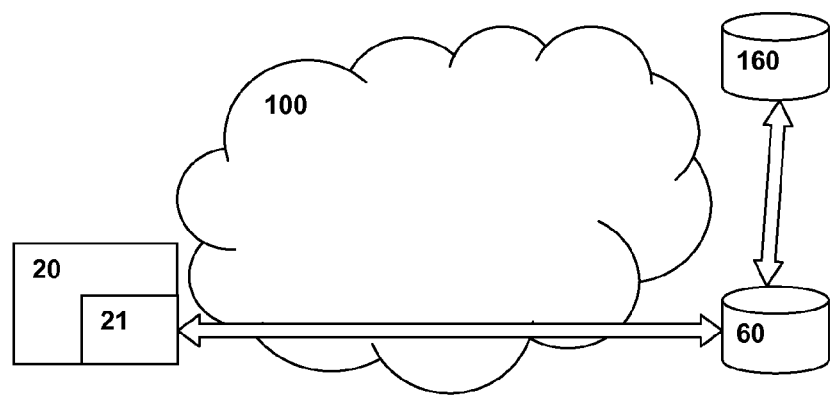
FIG. 1 schematically illustrates a communication device having a secure element, a communication network as well as a first and second server entity.

The present invention provides a technically simple, effective and especially cost effective solution for enabling an authentication and/or an identification of a secure element located in a communication device that is requesting a service from a service provider (first server entity). The present invention further provides a secure element, as well as a system comprising the secure element, the service provider (first server entity) and an authentication server entity (second server entity) that allows for a cost effective and comparably simple solution for enabling the authentication and/or the identification of the secure element towards the first server entity by means of the second server entity.

In an embodiment, the present invention provides a method for an enhanced authentication and/or an enhanced identification of a secure element located in a communication device, especially associated to a subscriber of a mobile communication network and especially being a user equipment, wherein a communication link is established between the communication device, on the one hand, and a first server entity, on the other hand, wherein the secure element comprises a signed public key and a private key of an algorithm for public-key cryptography, wherein the secure element and/or the communication device is authenticated and/or identified by a second server entity, wherein the method comprises the following steps:

a first message is transmitted to the secure element in the communication device (especially from the first server entity to the secure element), a second message is transmitted, subsequent to the transmission of the first message, from the secure element to the first server entity, the second message comprising at least the signed public key associated to the secure element and a signature information, the signature information generated—by using the private key associated to the secure element—from a signing message content, wherein the signing message content comprises at least one information element that is omitted in the second message, a third message is transmitted, subsequent to the transmission of the second message, to the second server entity, the third message comprising at least the signed public key associated to the secure element and the signature information, wherein the signing message content including the at least one information element that is omitted in the second message is accessible to or derivable by the second server entity in view of a verification of the signature information contained in the second message for authentication and/or identification purposes.

In an embodiment, the present invention provides a method for an enhanced authentication and/or an enhanced identification of a secure element located in a communication device, especially associated to a subscriber of a mobile communication network and especially being a user equipment, wherein a communication link is established between the communication device, on the one hand, and a first server entity, on the other hand, wherein the secure element comprises a signed public key and a private key of an algorithm for public-key cryptography, wherein the secure element and/or the communication device is authenticated and/or identified by a second server entity, wherein the method comprises the following steps:

a first message is transmitted to the secure element in the communication device (especially from the first server entity to the secure element), a second message is transmitted, subsequent to the transmission of the first message, from the secure element to the first server entity, the second message comprising at least the signed public key associated to the secure element and a signature information, the signature information generated—by using the private key associated to the secure element—from a signing message content, wherein the signing message content comprises at least one information element that is omitted in the second message, a third message is transmitted, subsequent to the transmission of the second message, to the second server entity, the third message comprising at least the signed public key associated to the secure element and the signature information, wherein the signing message content including the at least one information element that is omitted in the second message is accessible to or derivable by the second server entity in view of a verification of the signature information contained in the second message for authentication and/or identification purposes, wherein as the signed public key a certificate is used, comprising a public key together with a subject and a signature, wherein the second server entity retrieves the at least one information element from the subject of the certificate, wherein the subject is an identification information of the secure element.

According to the present invention, a communication link (especially in view of a service to be provided by the service provider or the portal service to the communication device) is established between the communication device, on the one hand, and the service provider or portal service (i.e. the first server entity), on the other hand, but where the communication device is not yet authenticated and/or identified towards the first server entity. The communication link might use the mobile communication network or another communication network. The second server entity (hereinafter also called authentication server) is used to conduct the authentication and/or identification process of the communication device towards the first server entity.

The present invention utilizes an authentication service of the secure element (especially the SIM element—such as a SIM card—to create or generate a "signature" (hereinafter called signature information) which is used to identify the communication device (i.e. the subscriber or the device), involving the second server entity (or authentication server). Thereby, the (conventional) existence—within the secure element—of a public key and a private key according to an algorithm for public-key cryptography is used for authentication and/or identification purposes. Typically, as signed public key a certificate is used, comprising the public key together with a subject and a signature, but other data structures for transmitting the public key and a signature are also possible.

According to such a conventional authentication method, the private and public key pair is stored in the secure element (or SIM card) together with a certificate or signature. The certificate or signature is created by the card manufacturer, who signs the public key of the secure element (or SIM card) together with a subject (especially an identification information of the secure element or the SIM card). If—according to the conventional authentication method—the secure element (or SIM card) signs a (received) challenge and returns the signature (of the challenge) together with the certificate, a service provider can then verify the signature. However, verification of a signature is one part, identification is another. According to conventional authentication methods, when the certificate of the secure element (especially a SIM card) is created by the card manufacturer, the MSISDN number is usually not yet known. Hence the MSISDN number cannot be used as subject of the certificate. Also the IMSI (International Mobile Subscriber Information) of the secure element (especially the SIM card) should not be used as subject, because often, the IMSI is treated as sensitive data. This leaves other attributes like the ICCID or a unique number to be used as a subject. Successful verification in this case means that the signature was made by a valid card of the network operator, but usually the service provider cannot map the subject to the identity of the subscriber or to an MSISDN (e.g. to reach the M2M device). Hence there are several drawbacks in using the conventional authentication method.

The present invention provides a mechanism to offer an authentication service (by means of the second server entity)—especially an authentication service provided by a network operator of a mobile communication network—, which on the one hand verifies the signature and on the other side provides the identity (of the communication device towards a first server entity, especially a service provider or portal). According to the present invention, some information or information element is omitted in the response (from the secure element), this information element having been used to generate the signature. However this missing information is accessible to the network operator (i.e. it can be retrieved by the network operator) and hence the network operator can conduct the verification.

This means that according to the present invention, after triggering the inventive authentication and/or identification process within the secure element of the communication device (typically, the communication device (or user equipment) sends a command to the integrated SIM card triggering the start of the inventive authentication and/or identification process), a message (hereinafter also called second message) is generated by the secure element.

This (second) message comprises at least the signed public key associated to the secure element (i.e. the signed public key according to the algorithm for public-key cryptography of the secure element) as well as a signature information.

The signature information is generated—by using the private key (i.e. the private key according to the algorithm for public-key cryptography of the secure element) in a signature generating process (usually involving a cryptographic hash function) according to the algorithm for public-key cryptography—from a signing message content (i.e. the signature generating algorithm (or signing algorithm) of the secure element is operated upon the signing message content).

According to the present invention, the signing message content (i.e. the information upon which the signature generating algorithm is conducted or to which the signature generating algorithm is applied) comprises at least one information element that is omitted (i.e. not sent) in the (second) message, hereinafter also called missing information element, which is part of the signing message content and is hence part of the information subjected to the signature generating algorithm.

Thereby, it is advantageously possible according to the present invention that the verification (for authentication and/or identification purposes) of the signature information generated by the secure element (and transmitted as part of the second message) can only be conducted by an instance or an entity that has access to the information element (that is not comprised (i.e. at least not comprised in plaintext) in the second message) via another path or source. According to the present invention, the second server entity (or the authentication server (entity)) has access to the information element missing in the second message such that a verification of the signature information (as part of the second message generated by the secure element) is possible. This means that in order to perform the verification of the signature information, the second server entity needs to operate the signature verification algorithm with the signed public key (according to the algorithm for public-key cryptography of the secure element)—on a (predefined) combination of the information content provided by the second message and the information element missing in the second message.

According to the present invention, a first message is transmitted—prior to the generation (and hence the transmission of the second message) of the second message by the secure element—to the secure element in the communication device. According to the present invention, the first message is especially transmitted from the first server entity to the secure element in the communication device; however, in case that there is no initial communication between the first server entity and the secure element, the first message can also be generated by the communication device. The first message serves to trigger the authentication process, i.e. the generation of the second message. According to a preferred embodiment of the present invention, the first message comprises a challenge information, wherein especially the challenge information is part of the signing message content and/or is part of the second message. However, the first message does not need to comprise a challenge information. The challenge information can also be generated, e.g., within the communication device. Especially in the case that the first message does not comprise any challenge information, the first message is part of an initial flow of data transmitted between the first server entity on the one hand, and the communication device on the other hand, the initial flow of data being typically a bidirectional data flow between the first server entity and the communication device such that in any case an information is transmitted to the secure element.

Furthermore, it is preferred according to the present invention that the second message comprises a counter information or a random number information generated by the secure element/card (wherein especially the counter information or random number information is part of the signing message content and part of the second message).

Furthermore, it is preferred according to the present invention that the second message comprises a certificate information or a signed public key (wherein especially the certificate information is part of the signing message content and part of the second message).

As an example, the second message (generated by the secure element (or the SIM card)) comprises all of the following:
- the certificate information (of the secure element),
- a random number (especially a random number in the form of a nonce (i.e. an arbitrary number used only once in a cryptographic communication, especially a random or pseudo-random number generated in an algorithm) generated by the secure element,
- the challenge information (comprised in the first message received by the secure element), as well as
- the signature information, computed, by the secure element, by applying the cryptographic hash function in conjunction with the private key on the signing message content.

It is preferred according to the present invention that the signature information is or corresponds to or at least comprises a hash value, i.e. the result of applying or operating a hash function on the signing message content, especially a cryptographic hash function. This is equivalent to the signature generating algorithm being or at least comprising a (cryptographic) hash function or a (cryptographic) hash function algorithm.

According to the present invention, it is furthermore preferred that—according to a first alternative variant of the present invention—a fourth message is transmitted, subsequent to the transmission of the third message, from the second server entity to the first server entity, the fourth message comprising a verification information concerning a further information element comprised in the second and/or third message, or that—according to a second alternative variant of the present invention—a fifth message is transmitted, subsequent to the transmission of the third message, from the second server entity to the first server entity, the fifth message comprising a further information element that the second and/or third message lacks.

Thereby, it is advantageously possible that the further information element—especially the MSISDN number of the subscriber to the mobile communication network—is either (according to the first alternative variant of the present invention) transmitted by means of the third message from the first server entity to the second server entity (and hence by means of the fourth message, a verification result regarding the further information element (especially the MSISDN number) is possible to be transmitted to the first server entity), or (according to the second alternative variant of the present invention) not transmitted by means of the second and/or third message from the first server entity to the second server entity (and hence can be transmitted by means of the fifth message to the first server entity after a verification has been conducted regarding the further information element (especially the MSISDN number))

Furthermore, it is preferred according to the present invention that the second and third message comprises an encrypted IMSI information (International Mobile Subscriber Information), the encrypted IMSI information corresponding to the IMSI of the secure element of the communication device, encrypted by the secure element with a key that is known to the second server.

Thereby, it is advantageously possible that an information unique in view of the secure element (or the SIM card)—the IMSI information—is used for identifying the communication device, and that nevertheless the plaintext of the IMSI information is not transmitted during the inventive method (i.e. can be kept confidential) as only an encrypted version of the IMSI information is transmitted.

Alternatively to using the (encrypted) IMSI information for identifying the communication device, it is alternatively also possible to use another information unique in view of the secure element (or the SIM card), such as the ICCID (Integrated Circuit Card Identifier) or the encrypted ICCID.

Furthermore, it is preferred according to the present invention that the second server entity is part of the mobile communication network.

Thereby, it is advantageously possible according to the present invention that the authentication server, i.e. the second server entity, and the associated services can be easily delivered by the network operator of the mobile communication network.

Furthermore, the present invention relates to a secure element for an enhanced authentication and/or an enhanced identification of the secure element, the secure element being located in a communication device, especially associated to a subscriber of a mobile communication network and especially being a user equipment, wherein the secure element comprises a signed public key and a private key of an algorithm for public-key cryptography, wherein the secure element is configured such that in case that
  a communication link is established between the communication device, on the one hand, and a first server entity, on the other hand, and
  a first message is transmitted from the first server entity to the secure element in the communication device,
the secure element generates a second message, the second message comprising at least the signed public key associated to the secure element and a signature information, the signature information being a signed hash value—by using the private key associated to the secure element—from a signing message content, wherein the signing message content comprises at least one information element that is not transmitted in the second message.

Furthermore, the present invention relates to a secure element for an enhanced authentication and/or an enhanced identification of the secure element, the secure element being located in a communication device, especially associated to a subscriber of a mobile communication network and especially being a user equipment, wherein the secure element comprises a signed public key and a private key of an algorithm for public-key cryptography, wherein the secure element is configured such that in case that
  a communication link is established between the communication device, on the one hand, and a first server entity, on the other hand, and
  a first message is transmitted from the first server entity to the secure element in the communication device,
the secure element generates a second message, the second message comprising at least the signed public key associated to the secure element and a signature information, the signature information being a signed hash value—by using the private key associated to the secure element—from a signing message content, wherein the signing message content comprises at least one information element that is not transmitted in the second message, wherein the signed public key is a certificate, comprising a public key together with a subject and a signature, wherein the second server entity is configured to retrieve the at least one information element from the subject of the certificate, wherein the subject is an identification information of the secure element.

According to an alternative embodiment of the secure element according to the present invention, the communication link is not established—prior to transmitting the first message—between the communication device, on the one hand, and a first server entity, on the other hand, but the first message is sent from the communication device to the secure element, and the second message is generated as indicated above.

All preferred embodiments as mentioned above with regard to the inventive method are also—mutatis mutandis—to be applied to the secure element.

Additionally, the present invention relates to a system for an enhanced authentication and/or an enhanced identification of a secure element located in a communication device, especially associated to a subscriber of a mobile communication network and especially being a user equipment, wherein the system comprises, besides the secure element and the communication device, a first server entity and a second server entity, wherein the secure element comprises a signed public key and a private key of an algorithm for public-key cryptography, wherein the system is configured such that in case that
  a communication link is established between the communication device, on the one hand, and a first server entity, on the other hand, and
  a first message is transmitted from the first server entity to the secure element in the communication device,
the secure element generates a second message, the second message comprising at least the signed public key associated to the secure element and a signature information, the signature information being a signed hash value—by using the private key associated to the secure element—from a signing message content, wherein the signing message content comprises at least one information element that is omitted in the second message, and wherein the system is configured such that a third message is transmitted to the second server entity, the third message comprising at least the signed public key associated to the secure element and the signature information, wherein the signing message content including the at least one information element that is omitted in the second message is accessible to or derivable by the second server entity in view of a verification of the signature information contained in the second message for authentication and/or identification purposes Additionally, the present invention relates to a system for an enhanced authentication and/or an enhanced identification of a secure element located in a communication device, especially associated to a subscriber of a mobile communication network and especially being a user equipment, wherein the system comprises, besides the secure element and the communication device, a first server entity and a second server entity, wherein the secure element comprises a signed public key and a private key of an algorithm for public-key cryptography, wherein the system is configured such that in case that > a communication link is established between the communication device, on the one hand, and a first server entity, on the other hand, and
>
> a first message is transmitted from the first server entity to the secure element in the communication device, the secure element generates a second message, the second message comprising at least the signed public key associated to the secure element and a signature information, the signature information being a signed hash value—by using the private key associated to the secure element—from a signing message content, wherein the signing message content comprises at least one information element that is omitted in the second message, and wherein the system is configured such that a third message is transmitted to the second server entity, the third message comprising at least the signed public key associated to the secure element and the signature information, wherein the signing message content including the at least one information element that is omitted in the second message is accessible to or derivable by the second server entity in view of a verification of the signature information contained in the second message for authentication and/or identification purposes, wherein the signed public key is a certificate, comprising a public key together with a subject and a signature, wherein the second server entity is configured to retrieve the at least one information element from the subject of the certificate, wherein the subject is an identification information of the secure element.

According to an alternative embodiment of the system according to the present invention, the communication link is not established—prior to transmitting the first message—between the communication device, on the one hand, and a first server entity, on the other hand, but the first message is sent from the communication device to the secure element, and the second message is generated as indicated above.

All preferred embodiments as mentioned above with regard to the inventive method are also—mutatis mutandis—to be applied to the inventive system.

Additionally, the present invention relates to a program comprising a computer readable program code which, when executed on a computer or on a secure element or on a network component of a mobile communication network, causes the computer or the secure element or the network component of the mobile communication network to perform the inventive method.

Still additionally, the present invention relates to computer program product for using a machine type communication device with a mobile communication network, the computer program product comprising a computer program stored on a storage medium, the computer program comprising program code which, when executed on a computer or on a secure element or on a network component of a mobile communication network, causes the computer or the secure element or the network component of the mobile communication network to perform the inventive method.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a communication device 20 having a secure element 21 is schematically shown. The communication device 20 can, inter alia, be used in (or in connection with) a mobile communication network 100. FIG. 1 shows a use case of the communication device 20, where the communication device 20 is connected with the mobile communication network 100. However, other use cases—e.g., where the communication device 20 is connected to a further communication network, e.g. using WLAN, can also be realized according to the present invention. The mobile communication network 100 is especially a public land mobile network 100 (cellular telecommunications network) and comprises typically an access network and a core network. In the scenario represented in FIG. 1, the communication device 20 is connected—via the mobile communication network 100—to a first server entity 60. The first server entity 60 typically corresponds to a portal/server entity of a service provider that is contacted by the user of the communication device 20 in order to obtain a service. In order for the first server entity 60 to be able to authenticate and/or identify the communication device 20 (regarding a service request transmitted from the communication device 20 to the first server entity 60), the first server entity contacts a second server entity 160 which is often part of the mobile communication network 100 but not necessarily. The communication device 20 is typically any user equipment being able to communicate with the mobile communication network 100 and also able to communicate via another channel (e.g. the further communication network) than the direct communication with the mobile communication network 100 to the first server entity 60. For example, the communication device 20 can also be a machine to machine communication device (machine type communication device). In case that the communication device 20 accesses the first server entity via the mobile communication network 100 (which is typically possible), the identity of the communication device 20 (or of its user) can be transmitted to the first server entity 60, and the identity of the communication device 20 is approved by the mobile communication network 100. This is not the case if the first server entity 60 is accessed via the further communication network. In this situation, the present invention suggests using the second server entity 160 as an authentication server. The secure element 21 is typically a SIM card (either a hardware or a soft SIM (card)) located in the communication device 20. The secure element 21 comprises a signed public key and a private key of an algorithm for public-key cryptography, wherein the secure element 21 and/or the communication device 20 is authenticated and/or identified by the second server entity 160 (hereinafter also called authentication sever) by applying conventional mathematical functions to conduct public-key cryptography.

Figure 2:
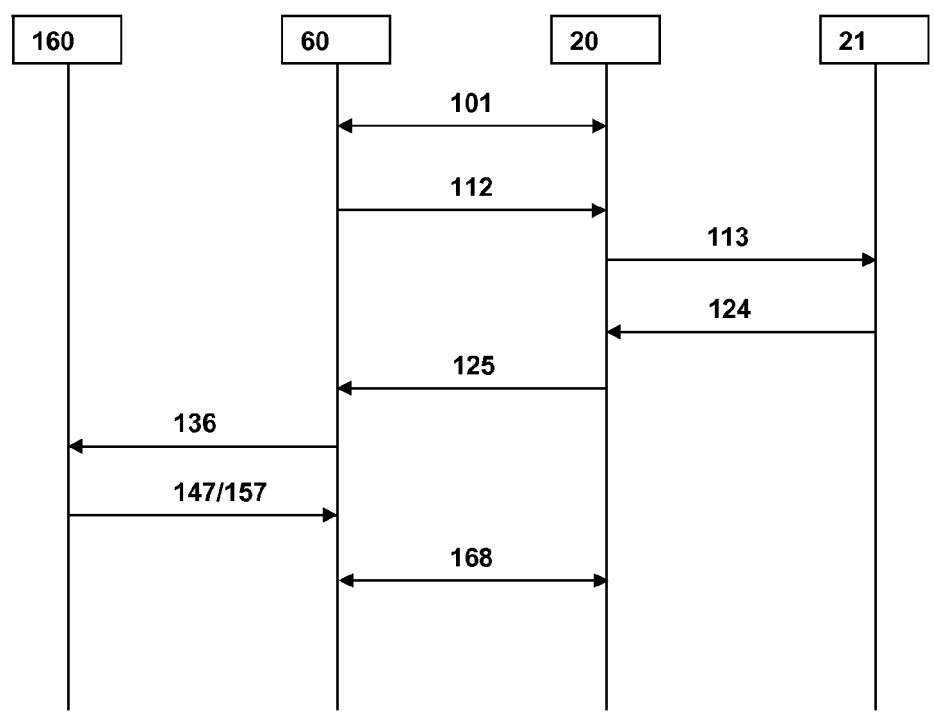
FIG. 2 schematically illustrates a communication diagram between a secure element (or SIM card), a communication device (or user equipment), the first server entity (service provider/portal server), and the second server entity (authentication server).

In FIG. 2, a communication diagram of the communication—according to the present invention, especially to the method according to the present invention—between the communication device 20 (or the secure element 21 located within the communication device 20), the first server entity 60, and the second server entity 160 is schematically shown.

In a first processing step 101, an initial flow of data is transmitted between the first server entity 60 on the one hand, and the communication device 20 on the other hand, the initial flow of data being typically a bidirectional data flow between the first server entity 60 and the communication device 20 (using, e.g. the mobile communication network 100 or the further communication network). In a second processing step 112 and in a third processing step 113, a first message is transmitted from the first server entity 60 to the secure element 21 in the communication device 20. The message transmitted in the second processing step 112 (concerning a transmission between the first server entity 60 and the communication device 20) is either identical to the message transmitted in the third processing step 113 (concerning a transmission between the communication device 20 and the secure element 21, i.e. typically occurring within the communication device 20), or it is not identical; in the context of the present invention, the first message arrives at the secure element 21.

In a fourth processing step 124 and in a fifth processing step 125, a second message is transmitted, subsequent to the transmission of the first message, from the secure element 21 to the first server entity 60. The message transmitted in the fourth processing step 124 (concerning a transmission between the secure element 21 and the communication device 20, i.e. typically occurring within the communication device 20) is either identical to the message transmitted in the fifth processing step 125 (concerning a transmission between the communication device 20 and the first server entity 60), or it is not identical; in the context of the present invention, the second message arrives at the second sever entity 160.

According to the present invention, the second message comprises at least the signed public key associated to the secure element 21 and a signature information, the signature information being generated—by using the private key associated to the secure element 21—from a signing message content, wherein the signing message content comprises at least one information element that is omitted in the second message. Without the knowledge of the at least one information element omitted in the second message, it is impossible to verify whether the signature information (obtained by applying the signature generating process or algorithm (using the private key of the secure element) to the signing message content, the signing message content comprising the at least one information element).

In a sixth processing step 136, a third message is transmitted, subsequent to the transmission of the second message, to the second server entity 160, and especially from the first server entity 60 to the second server entity 160 (according to a variant of the present invention, it could also be possible to transmit the third message from the communication device 20 or another node or entity of the communication system to the second server entity 160). The third message comprises at least the signed public key associated to the secure element 21 and the signature information, wherein the signing message content including the at least one information element that is omitted in the second message is accessible to or derivable by the second server entity 160 in view of a verification of the signature information contained in the second message for authentication and/or identification purposes.

In a first alternative 147 of a seventh processing step, a fourth message is transmitted, subsequent to the transmission of the third message, from the second server entity 160 to the first server entity 60, the fourth message comprising a verification information concerning a further information element comprised in the second and/or third message. According to a second alternative 157 of the seventh processing step, instead of the fourth message, a fifth message is transmitted (likewise subsequent to the transmission of the third message) from the second server entity 160 to the first server entity 60, the fifth message comprising a further information element that the second and/or third message lacks. The verification information of the fourth message serves especially to validate or verify that the further information element—e.g. a MSISDN number—is correct (i.e. identified by the authentication server 160). In this case, the further information element is transmitted (by means of at least the third message but potentially also the second message) to the authentication server 160, and the authentication server 160 returns a positive verification information (or positive validation information) in case that the transmitted further information element is correct, and a negative verification information in case that the transmitted further information element is not correct (e.g. does not correspond to the secure element 21). In case of applying the second alternative 157 of the seventh processing step, the fifth message comprises the further information element (e.g. the MSISDN number) that the second and/or third message lacks.

After having successfully conducted the seventh processing step, communication device 20 (or the secure element 21 within the communication device 20) is authenticated and/or identified towards the first server entity 60, and hence the requested communication or the requested service (requested by the communication device 20) can be delivered by means of a further flow of data transmitted between the first server entity 60 on the one hand, and the communication device 20 on the other hand, the further flow of data being typically a bidirectional data flow between the first server entity 60 and the communication device 20.

In the context of the present invention, an authentication service is performed by the second server entity 160, especially by using an applet of the SIM to generate a signature information (or signature), where the signed public key of the secure element 21 and a certificate information is returned (by means of the second message), and where the at least one information element (i.e. some additional data X) is used for creating the signature information (or signature), which is not returned in the SIM response (i.e. the second message), and where the at least one information element can be retrieved based on the received data by the authentication server 160. This allows the network operator to offer the service of the authentication server 160 as an authentication service for the service provider of the first server entity 60 to verify the signature and either return the MSISDN (by means of the fifth message) or verify a presented MSISDN (by means of the fourth message).

As the at least one information element (or missing data X), the following pieces of information can, e.g., be used:
 the encrypted IMSI (encrypted with a key (or encryption password) which is known to the card manufacturer and the authentication server 160 (or authentication service) of the network operator) which is personalized by the card manufacturer, the encrypted ICCID (with a key (or encryption password) which is known to the card manufacturer and the authentication server 160 (or authentication service) of the network operator) which is personalized by the card manufacturer, or the IMSI (with however having the disadvantage that some smart phone applications have permission to read the IMSI from the secure element and could forward it to the service provider such that the (non-encrypted) IMSI would not necessarily constituted an at least one information element being unknown by the first server entity 60).

An example of a possible process flow is as follows:

The card manufacturer personalizes a private and signed public key into the secure element 21 (i.e. into a card, especially a SIM card) and creates a certificate, with a non-sensitive subject (e.g. ICCID or other unique value). In addition, the at least one information element (i.e. some additional data X) is personalized in the secure element 21, e.g. an encrypted IMSI;

A user using the communication device 20 (such as a smart phone with a smart phone application) wants to use a service from a service provider, such as a service of a service provider internal to the network operator or a service offered by a third party;

To use (or register for) the service, the communication device 20 (customer/device or user equipment) may or may not present its MSISDN number (i.e. the further information element);

The service provider wants to verify the presented MSISDN number (i.e. the further information element) or wants to request the MSISDN number from the network operator. Therefore the service provider first sends a challenge (comprised in the first message) to the communication device 20 (e.g. to the smart phone application);

The smart phone application sends this challenge to the secure element 21, especially to the authentication service applet in the SIM card;

The secure element 21, especially the authentication service applet, signs the challenge with its private key. The signature is done over the challenge, some card random (e.g. random value generated inside the SIM or a counter value) and the at least one information element (i.e. the additional data X);

All data necessary to verify the signature is returned (in the second message), except the at least one information element (or data X), i.e. the signature, the certificate of the card (including the signed public key), the challenge and the card random are all returned but not the at least one information element (or data X);

The communication device 20 or the application within the secure element 21 forwards the card response (i.e. the second message or as part of the second message) to the service provider, i.e. to the first server entity 60, where a verification of the signature is not possible due to the missing or omitted at least one information element (or data X);

The service provider, i.e. the first server entity 60, forwards, in the third message, the card response (and optionally the MSISDN) to the authentication server 160 of the network operator;

The authentication server 160 (typically of the network operator of the mobile communication network 100) retrieves the at least one information element (or missing data X) from the subject of the certificate and/or from the presented MSISDN number and verifies the signature.

The verification result (ok/not ok) is returned (as part of the fourth message) to the service provider or first server entity 60.

If a positive verification information (or result) is returned, the service provider knows that the customer has provided the correct MSISDN and can grant the requested service to the communication device 20.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for enhanced authentication and/or enhanced identification of a secure element of a user equipment, the secure element being associated with a subscriber of a mobile communication network, wherein a communication link is established between the user equipment and a first server entity, wherein the secure element comprises a signed public key and a private key, wherein the secure element and/or the user equipment is authenticated and/or identified by a second server entity, the method comprising:

transmitting a first message to the secure element;

receiving, by a processor of the first server entity, a second message, subsequent to the transmission of the first message, from the secure element at the first server entity, the second message comprising at least the signed public key and a signature information, the signature information being generated from a signing message content using the private key, wherein the signing message content comprises at least one information element that is omitted in the second message; and transmitting a third message, subsequent to the transmission of the second message, to the second server entity, the third message comprising at least the signed public key and the signature information, wherein the signing message content is accessible to or derivable by the second server entity in view of a verification of the signature information contained in the second message for authentication and/or identification purposes;

wherein a certificate is used as the signed public key, comprising a public key together with a subject and a signature, and wherein the second server entity retrieves the at least one information element from the subject of the certificate, wherein the subject is an identification information of the secure element.

2. The method according to claim 1, further comprising:
receiving a fourth message, subsequent to the transmission of the third message, from the second server entity at the first server entity, the fourth message comprising a verification information concerning a further information element comprised in the second and/or third message.

3. The method according to claim 2, wherein the further information is the Mobile Subscriber Integrated Services Digital Network (ISDN) Number (MSISDN) of the subscriber to the mobile communication network.

4. The method according to claim 1, further comprising:
receiving a fifth message, subsequent to the transmission of the third message, from the second server entity at the first server entity, the fifth message comprising a further information element that the second and/or third message lacks.

5. The method according to claim 4, wherein the further information is the Mobile Subscriber Integrated Services Digital Network (ISDN) Number (MSISDN) of the subscriber to the mobile communication network.

6. The method according to claim 1, wherein the second and third message comprises an encrypted International Mobile Subscriber Information (IMSI), the encrypted IMSI information corresponding to the IMSI of the secure element, encrypted by the secure element using a key known to the second server.

7. The method according to claim 1, wherein the second server entity is part of the mobile communication network.

8. The method according claim 1, wherein the first message comprises a challenge information, wherein the challenge information is part of the signing message content and is part of the second message.

9. The method according to claim 1, wherein the second message comprises a counter or random number information, and wherein the counter or random number information is part of the signing message content and part of the second message.

10. A system for enhanced authentication and/or enhanced identification of a secure element of a user equipment, the secure element being associated with a subscriber of a mobile communication network, wherein the system comprises:
the secure element;
the communication device;
a first server entity; and
a second server entity;
wherein the secure element comprises a signed public key and a private key;
wherein a communication link is established between the communication device and a first server entity;
wherein the first server entity is configured to transmit a first message to the secure element;
wherein the secure element is configured to generate a second message, the second message comprising at least the signed public key and a signature information, the signature information being generated from a signing message content using the private key, wherein the signing message content comprises at least one information element that is omitted in the second message;
wherein second server entity is configured to receive a third message, the third message comprising the signed public key associated to the secure element and the signature information, wherein the signing message content is accessible to or derivable by the second server entity in view of a verification of the signature information contained in the second message for authentication and/or identification purposes;
wherein the signed public key is a certificate, comprising a public key together with a subject and a signature; and
wherein the second server entity is configured to retrieve the at least one information element from the subject of the certificate, wherein the subject is an identification information of the secure element.

11. A non-transitory, processor-readable medium having processor-executable instructions stored thereon for enhanced authentication and/or enhanced identification of a secure element of a user equipment, the secure element being associated with a subscriber of a mobile communication network, wherein a communication link is established between the user equipment and a first server entity, wherein the secure element comprises a signed public key and a private key, wherein the secure element and/or the user equipment is authenticated and/or identified by a second server entity, the processor-executable instructions, when executed by a processor, facilitating the following steps:
transmitting a first message to the secure element;
receiving a second message, subsequent to the transmission of the first message, from the secure element at the first server entity, the second message comprising at least the signed public key and a signature information, the signature information being generated from a signing message content using the private key, wherein the signing message content comprises at least one information element that is omitted in the second message; and
transmitting a third message, subsequent to the transmission of the second message, to the second server entity, the third message comprising at least the signed public key and the signature information, wherein the signing message content is accessible to or derivable by the second server entity in view of a verification of the signature information contained in the second message for authentication and/or identification purposes;
wherein a certificate is used as the signed public key, comprising a public key together with a subject and a signature, and wherein the second server entity retrieves the at least one information element from the subject of the certificate, wherein the subject is an identification information of the secure element.

* * * * *